United States Patent [19]
Carter

[11] Patent Number: 5,878,419
[45] Date of Patent: Mar. 2, 1999

[54] METHOD FOR CREATING A RELATIONAL DESCRIPTION OF A FORMATTED TRANSACTION

[75] Inventor: Stephen R. Carter, Spanish Fork, Utah

[73] Assignee: Novell, Inc., Provo, Utah

[21] Appl. No.: 782,379

[22] Filed: Jan. 13, 1997

Related U.S. Application Data

[60] Provisional application No. 60/010,231 Jan. 19, 1996.

[51] Int. Cl.$^6$ .................................................. G06F 17/30
[52] U.S. Cl. .............................................................. 707/10
[58] Field of Search .............................................. 707/10

[56] References Cited

U.S. PATENT DOCUMENTS

| | | | |
|---|---|---|---|
| 4,769,772 | 9/1988 | Dwyer ..................................... | 364/300 |
| 4,805,099 | 2/1989 | Huber ..................................... | 364/300 |
| 4,891,785 | 1/1990 | Donohoo ................................. | 364/900 |
| 4,930,071 | 5/1990 | Tou et al. ............................... | 364/300 |
| 4,951,196 | 8/1990 | Jackson ................................... | 364/401 |
| 5,202,977 | 4/1993 | Pasetes, Jr. et al. ................... | 395/500 |
| 5,212,787 | 5/1993 | Baker et al. ............................ | 395/600 |
| 5,230,075 | 7/1993 | Premerlani et al. ................... | 707/1 |
| 5,257,366 | 10/1993 | Adair et al. ............................. | 395/600 |
| 5,265,065 | 11/1993 | Turtle .................................... | 395/600 |
| 5,367,675 | 11/1994 | Cheng et al. ........................... | 395/600 |
| 5,375,070 | 12/1994 | Hershey et al. ..................... | 395/200.54 |
| 5,398,199 | 3/1995 | Lefons ................................... | 364/735 |
| 5,408,652 | 4/1995 | Hayashi et al. ....................... | 395/600 |
| 5,410,675 | 4/1995 | Shreve et al. .......................... | 395/500 |
| 5,416,917 | 5/1995 | Adair et al. ............................ | 395/500 |
| 5,499,358 | 3/1996 | Nevarez ................................. | 395/600 |
| 5,535,322 | 7/1996 | Hecht ..................................... | 705/1 |
| 5,608,874 | 3/1997 | Ogawa et al. ....................... | 395/200.76 |
| 5,712,989 | 1/1998 | Johnson et al. ....................... | 705/28 |
| 5,715,397 | 2/1998 | Ogawa et al. ....................... | 395/200.76 |

OTHER PUBLICATIONS

"Electronic Data Interchange", Draft, ANSI ASC X12 Committee, American Standards Institute, Dec. 1990, Selected Pages.

*Primary Examiner*—Wayne Amsbury
*Attorney, Agent, or Firm*—Compurter Law++

[57] ABSTRACT

Methods for creating and using a relational description of a formatted transaction while maintaining data element context are provided. The formatted transaction can be in electronic data interchange (EDI) format or another structured transaction format. A computer receiving the formatted transaction generates or is provided with a set of assignments of unique persistent tags to all possible data element contexts that are of interest. As the transaction is being parsed, each of its data elements is tagged with the appropriate unique persistent tag that identifies its context. Each data element is then written to a field in a relation in which the column name of the field matches the unique persistent tag. Data elements that can occur only once in a transaction are written to a root relation, while data elements that can occur multiple times are written to a subrelation. Data elements that can occur multiple times within a group of data elements that itself can iterate as a group are written to a nested subrelation, up to any depth of nesting allowed by the transaction format definition. The invention also provides a method for constructing a transaction from a relational description.

36 Claims, 18 Drawing Sheets

1  ST*850
2  BEG*00*NE*CE5566778A**940911
3  NTE*DEL*DO NOT DELIVER AFTER 3PM
4  DTM*002*940915
5  N1*BT*GENERAL MFG CO.*09*1234567890002
6  N3*1806 HIGHWAY 35
7  N4*OCEAN*NJ*07712
8  N1* ST*GEN MFG, PLANT A*09*2345678900008
9  N3*1187 ELM STREET*MS F111
10 N4*BRANFORD*NJ*07633
11 PO1*1*2*DR***VI*XYZ223344
12 PID*F*NO.44 DEGREASING SOLVENT
13 PO1*2*250*YD***VI*PS8877665

*FIG. 2*

| POS. NO. | SEG. ID | NAME | REQ. DES. | MAX USE | LOOP REPEAT |
|---|---|---|---|---|---|
| 010 | ST | TRANSACTION SET HEADER | M | 1 | |
| 020 | BEG | BEGINNING SEGMENT FOR PURCHASE ORDER | M | 1 | |
| 030 | NTE | NOTE/SPECIAL INSTRUCTION | F | 100 | |
| 040 | CUR | CURRENCY | O | 1 | |
| 050 | REF | REFERENCE NUMBERS | O | 12 | |
| 060 | PER | ADMINIATRATIVE CONTACT | O | 3 | |
| 070 | TAX | SALES TAX REFERENCE | O | 3 | |
| 080 | FOB | F.O.B. RELATED INSTRUCTIONS | O | 1 | |
| 090 | CTP | PRICING INFORMATION | O | 25 | |
| 100 | SSS | SPECIAL SERVICES | O | 25 | |
| 110 | CSH | HEADER SALE CONDITION | O | 1 | |
| 120 | ITA | ALLOWANCE, CHARGE OR SERVICE | O | 10 | |
| 130 | ITD | (DEFERRED)TERMS OF SALE | O | 5 | |
| 140 | DIS | DISCOUNT DETAIL | O | 20 | |
| 150 | DTM | DATE/TIME REFERENCE | O | 10 | |
| . | | . . | | | |
| . | | . . | | | |
| . | | . . | | | |
| 230 | TD1 | CARRIER DETAILS (QUANTITY, WEIGHT) | O | 2 | |
| 240 | TD5 | CARRIER DETAILS (ROUTING SEQ./TRAN. TIME) | O | 2 | |
| 250 | TD3 | CARRIER DETAILS (EQUIPMENT) | O | 2 | |
| 260 | TD4 | CARRIER DETAILS (SPECIAL HANDLING/ HAZ. MAT.) | O | 2 | |

*FIG. 3*

| POS. NO. | SEG. ID | NAME | REQ. DES. | MAX USE | LOOP REPEAT |
|---|---|---|---|---|---|
| 270 | MAN | MARKS AND NUMBERS | O | 10 | |
| 280 | CTB | RESTRICTIONS/CONDITIONS | O | 5 | |
| 290 | N9 | REFERENCE NUMBER | O | 1 | 1000 |
| 300 | MSG | MESSAGE TEXT | O | 1000 | |
| 310 | N1 | NAME | O | 1 | 200 |
| 320 | N2 | ADDITIONAL NAME INFORMATION | O | 2 | |
| 330 | N3 | ADDRESS INFORMATION | O | 2 | |
| 340 | N4 | GEOGRAPHIC LOCATION | O | 1 | |
| 350 | REF | REFERENCE NUMBERS | O | 12 | |
| 360 | PER | ADMINISTRATIVE. CONTACT | O | 3 | |
| 370 | FOB | F.O.B. INSTRUCTIONS | O | 1 | |
| 380 | TD1 | CARRIER DETAILS (QUANTITY AND WEIGHT) | O | 2 | |
| . | | . . | | | |
| . | | . . | | | |
| . | | . . | | | |
| 420 | PKG | MARKING, PACKAGING, LOADING | O | 200 | |
| 010 | PO1 | PURCHASE ORDER BASELINE ITEM DATA | M | 1 | 100000 |
| 020 | CUR | CURRENCY | O | 1 | |
| 030 | PO3 | ADDITIONAL ITEM DETAIL | O | 25 | |
| 040 | CTP | PRICING INFORMATION | O | 25 | |
| 049 | MEA | MEASUREMENTS | O | 40 | |
| 050 | PID | PRODUCT/ITEM DESCRIPTION | O | 1 | 1000 |
| 060 | MEA | MEASUREMENTS | O | 10 | |
| 070 | PWK | PAPERWORK | O | 25 | |

*FIG. 4*

| POS. NO. | SEG. ID | NAME | REQ. DES. | MAX USE | LOOP REPEAT |
|---|---|---|---|---|---|
| 080 | PKG | MARKING, PACKAGING, LOADING | O | 200 | |
| 090 | PO4 | ITEM PHYSICAL DETAILS | O | 1 | |
| 100 | REF | REFERENCE NUMBERS | O | 12 | |
| 110 | PER | ADMINISTRATIVE CONTACT | O | 3 | |
| 120 | SSS | SPECIAL SERVICES | O | 25 | |
| . | | . . | | | |
| . | | . . | | | |
| . | | . . | | | |
| 280 | MAN | MARKS AND NUMBERS | O | 10 | |
| 290 | AMT | MONETARY AMOUNT | O | 1 | |
| 300 | SLN | SUBLINE ITEM DETAIL | O | 1 | 1000 |
| 310 | PID | PRODUCT/ITEM DESCRIPTIONS | O | 1000 | |
| 320 | PO3 | ADDITIONAL ITEM DETAIL | O | 104 | |
| 330 | N9 | REFERENCE NUMBER | O | 1 | 1000 |
| 340 | MSG | MESSAGE TEXT | O | 1000 | |
| 350 | N1 | NAME | O | 1 | 200 |
| 360 | N2 | ADDITIONAL NAME INFORMATION | O | 2 | |
| 370 | N3 | ADDRESS INFORMATION | O | 2 | |
| 380 | N4 | GEOGRAPHIC LOCATION | O | 1 | |
| 390 | REF | REFERENCE NUMBERS | O | 12 | |
| . | | . . | | | |
| . | | . . | | | |
| . | | . . | | | |
| 460 | PKG | MARKING, PACKAGING, LOADING | O | 200 | |

*FIG. 5*

| | TAG | SEG. ID | SEGMENT OR DATA ELEMENT NAME | USE |
|---|---|---|---|---|
| 1 | | | | |
| 2 | | | | |
| 3 | AA0 | ST | TRANSACTION SET HEADER | M |
| 4 | AAA | | TRANSACTION SET IDENTIFIER CODE | M |
| 5 | AAB | BEG | BEGINNING SEGMENT- | |
| 6 | | | (PURCHASE ORDER) | M |
| 7 | 1KM | | TRANSACTION SET PURPOSE CODE | M |
| 8 | 1KN | | PURCHASE ORDER TYPE CODE | M |
| 9 | 1KP | | PURCHASE ORDER NUMBER | M |
| 10 | 1KQ | | RELEASE NUMBER | O |
| 11 | 1KT | | PURCHASE ORDER DATE (YYMMDD) | M |
| 12 | 1KV | | CONTRACT NUMBER | O |
| 13 | 19Q | | ACKNOWLEDGEMENT TYPE | O |
| 14 | AAQ | NTE | NOTE/SPECIAL INSTRUCTION | O(100) |
| 15 | A0T | | NOTE REFERENCE CODE | O |
| 16 | A0U | | MESSAGE | M |
| 17 | A9L | CUR | CURRENCY | O |
| 18 | ALA | | ENTITY IDENTIFIER CODE | M |
| 19 | AL0 | | CURRENCY CODE | M |
| 20 | ALB | | EXCHANGE RATE | O |
| 21 | . | | . | . |
| 22 | . | | . | . |
| 23 | . | | . | . |
| 24 | 1KY | REF | REFERENCE NUMBERS | O(12) |
| 25 | 190 | | REFERENCE NUMBER QUALIFIER | M |
| 26 | 19B | | REFERENCE NO. | O |
| 27 | 191 | | DESCRIPTION (80) | O |
| 28 | 19C | NTE | NOTE/SPECIAL INSTRUCTION | O(100) |
| 29 | 195 | | NOTE REFERENCE CODE | O |
| 30 | 19G | | MESSAGE | M |

*FIG. 7*

| | TAG | SEG. ID | SEGMENT OR DATA ELEMENT NAME | USE |
|---|---|---|---|---|
| 31 | | | | |
| 32 | | | | |
| 33 | 19A | PER | ADMIN COMMUNICATIONS CONTACT | O(3) |
| 34 | 192 | | CONTACT QUALIFIER | M |
| 35 | 19D | | NAME | O |
| 36 | 193 | | COMMUNICATION NO. QUALIFIER | O |
| 37 | 196 | | COMMUNICATION NO. | O |
| 38 | 194 | NTE | NOTE/SPECIAL INSTRUCTION | O(100) |
| 39 | 19H | | NOTE REFERENCE CODE | O |
| 40 | 197 | | MESSAGE | M |
| 41 | AX4 | TAX | SALES TAX REFERENCE | O(3) |
| 42 | AY0 | | TAX IDENTIFICATION NUMBER | O |
| 43 | AYB | | LOCATION QUALIFIER | O |
| 44 | 0BN | | LOCATION IDENTIFIER | M |
| 45 | 0F3 | | LOCATION QUALIFIER | O |
| 46 | 0H1 | | LOCATION IDENTIFIER | M |
| 47 | 0HC | | LOCATION QUALIFIER | O |
| 48 | 072 | | LOCATION IDENTIFIER | M |
| 49 | 07D | | LOCATION QUALIFIER | O |
| 50 | 07T | | LOCATION IDENTIFIER | M |
| 51 | 07U | | LOCATION QUALIFIER | O |
| 52 | 0JG | | LOCATION IDENTIFIER | M |
| 53 | AY1 | | TAX EXEMPT CODE | O |
| 54 | AYC | NTE | NOTE/SPECIAL INSTRUCTION | O(100) |
| 55 | 0BP | | NOTE REFERENCE CODE | O |
| 56 | 0BQ | | MESSAGE | M |
| 57 | ALR | FOB | FOB RELATED INSTRUCTIONS | O |
| 58 | ANC | | SHIPMENT METHOD OF PAYMENT | M |
| 59 | AN2 | | LOCATION QUALIFIER | O |
| 60 | AQ2 | | DESCRIPTION (80) | O |
| 61 | . | | . | . |
| 62 | . | | . | . |
| 63 | . | | . | . |

*FIG. 8*

| | TAG | SEG. ID | SEGMENT OR DATA ELEMENT NAME | USE |
|---|---|---|---|---|
| 64 | | | | |
| 65 | | | | |
| 66 | AXF | CTP | PRICING INFORMATION | O(25) |
| 67 | . | | . | . |
| 68 | . | | . | . |
| 69 | . | | . | . |
| 70 | AX5 | SSS | SPECIAL SERVICES | O(25) |
| 71 | . | | . | . |
| 72 | . | | . | . |
| 73 | . | | . | . |
| 74 | AXG | CSH | HEADER SALE CONDITIONS | O |
| 75 | . | | . | . |
| 76 | . | | . | . |
| 77 | . | | . | . |
| 78 | AX6 | ITA | ALLOWANCE OR CHARGE | O(10) |
| 79 | . | | . | . |
| 80 | . | | . | . |
| 81 | . | | . | . |
| 82 | AXH | ITD | TERMS OF SALE/DEFERRED T OF S | O(5) |
| 83 | . | | . | . |
| 84 | . | | . | . |
| 85 | . | | . | . |
| 86 | 1MX | DIS | DISCOUNT DETAIL | O(20) |
| 87 | . | | . | . |
| 88 | . | | . | . |
| 89 | . | | . | . |
| 90 | A9M | DTM | DATE/TIME REFERENCE | O(10) |
| 91 | ALE | | DATE/TIME QUALIFIER | M |
| 92 | AL4 | | DATE (YYMMDD) | O |
| 93 | ALF | | TIME (HHMM) | O |
| 94 | AL5 | | TIME ZONE QUALIFIER | O |

*FIG. 9*

| | TAG | SEG. ID | SEGMENT OR DATA ELEMENT NAME | USE |
|---|---|---|---|---|
| 95 | | | | |
| 96 | | | | |
| 97 | ALG | NTE | NOTE/SPECIAL INSTRUCTION | O(100) |
| 98 | AMK | | NOTE REFERENCE CODE | O |
| 99 | AM9 | | MESSAGE | M |
| 100 | . | | . | . |
| 101 | . | | . | . |
| 102 | . | | . | . |
| 103 | AA5 | N1 | NAME | O(200) |
| 104 | A00 | | ENTITY IDENTIFIER CODE | O |
| 105 | A0B | | NAME | O |
| 106 | A01 | | IDENTIFICATION CODE QUALIFIER | O |
| 107 | ABY | | IDENTIFICATION CODE | M |
| 108 | ALN | NTE | NOTE/SPECIAL INSTRUCTION | O(100) |
| 109 | AMR | | NOTE REFERENCE CODE | O |
| 110 | AMT | | MESSAGE | M |
| 111 | A0C | N2 | ADDITIONAL NAME INFORMATION | O(2) |
| 112 | A1A | | NAME | M |
| 113 | A1U | | NAME | O |
| 114 | A02 | N3 | ADDRESS INFORMATION | O(2) |
| 115 | A10 | | ADDRESS | M |
| 116 | A1V | | ADDRESS | O |
| 117 | AOD | N4 | GEOGRAPHIC LOCATION | O |
| 118 | A1B | | CITY | O |
| 119 | A11 | | STATE OR PROVINCE | O |
| 120 | A1C | | POSTAL CODE | O |
| 120 | A12 | | COUNTRY | O |
| 122 | A1D | | LOCATION QUALIFIER | O |
| 123 | A1W | | LOCATION IDENTIFIER | M |

*FIG. 10*

| | TAG | SEG. ID | SEGMENT OR DATA ELEMENT NAME | USE |
|---|---|---|---|---|
| 124 | | | | |
| 125 | | | | |
| 126 | A9N | REF | REFERENCE NUMBERS | O(12) |
| 127 | . | | . | . |
| 128 | . | | . | . |
| 129 | . | | . | . |
| 130 | 0KU | TD5 | CARRIER DETL-RTNG SEQ/TRANS TIME | O(12) |
| 131 | 095 | | ROUTING SEQUENCE CODE | O |
| 132 | 09G | | IDENTIFICATION CODE QUALIFIER | O |
| 133 | 0LQ | | IDENTIFICATION CODE | O |
| 134 | 096 | | TRANSPORTATION METHOD CODE | O |
| 135 | 09H | | ROUTING (OR ORIGIN CARRIER) | O |
| 136 | 097 | | SHIPMENT/ORDER STATUS CODE | O |
| 137 | 09J | | LOCATION QUALIFIER | O |
| 138 | 0LR | | LOCATION IDENTIFIER | O |
| 139 | 098 | | TRANSIT DIRECTION CODE | O |
| 140 | 09K | | TRANSIT TIME QUALIFIER | O |
| 141 | 0LT | | TRANSIT TIME | O |
| 142 | 099 | NTE | NOTE/SPECIAL INSTRUCTION | O(100) |
| 143 | 0LU | | NOTE REFERENCE CODE | O |
| 144 | 0LV | | MESSAGE | M |
| 145 | 0KV | TD3 | CARRIER DETAIL (EQUIPMENT) | O(12) |
| 146 | . | | . | . |
| 147 | . | | . | . |
| 148 | . | | . | . |
| 149 | 0MW | PO1 | BASELINE ITEM DETAIL (PO) | M |
| 150 | 1DH | | ASSIGNED IDENTIFICATION | O |
| 151 | 1D7 | | QUANTITY ORDERED | M |
| 152 | 1DJ | | UNIT OF MEASURE | M |
| 153 | 1D8 | | UNIT PRICE | O |
| 154 | 135 | | BASIS OF UNIT PRICE CODE | O |

*FIG. 11*

| | TAG | SEG. ID | SEGMENT OR DATA ELEMENT NAME | USE |
|---|---|---|---|---|
| 155 | | | | |
| 156 | | | | |
| 157 | | 1DK | PRODUCT ID. QUALIFIER | O |
| 158 | | 13G | PRODUCT ID. | M |
| 159 | | 156 | PRODUCT ID. QUALIFIER | O |
| 160 | | 16V | PRODUCT ID. | M |
| 161 | | 16W | PRODUCT ID. QUALIFIER | O |
| 162 | | 1HG | PRODUCT ID. | M |
| 163 | | 1H6 | PRODUCT ID. QUALIFIER | O |
| 164 | | 1HL | PRODUCT ID. | M |
| 165 | | 1HM | PRODUCT ID. QUALIFIER | O |
| 166 | | 1HU | PRODUCT ID. | M |
| 167 | | . | . | . |
| 168 | | . | . | . |
| 169 | | . | . | . |

*FIG. 12*

1  *AAA850
2  *1KM00*1KNNE*1KPCE5566778A*1KT940911
3  *A0TDEL*A0UDO NOT DELIVER AFTER 3PM
4  *ALE002*AL4940915
5  *A00BT*A0BGENERAL MFG CO.*A0109*ABY1234567890002
6  *A101806 HIGHWAY 35
7  *A1BOCEAN*A11NJ*A1C07712
8  *A00ST*A0BGEN MFG, PLANT A*A0109*ABY2345678900008
9  *A101187 ELM STREET*A1VMS F111
10 *A1BBRANFORD*A11NJ*A1C07633
11 *1DH1*1D72*1DJDR*1DKVI*13GXYZ223344
12 *13PF*13TNO.44 DEGREASING SOLVENT
13 *1DH2*1D7250*1DJYD*1DKVI*13GPS8877665
14 *13PF*13T36IN HEAVY DUTY POLY SHEET

*FIG. 13*

1  *AAA 850
2  *1KM 00 *1KN NE *1KP CE5566778A *1KT 940911
3  *A0T DEL *A0U DO NOT DELIVER AFTER 3PM
4  *ALE 002 *AL4 940915
5  *A00 BT *A0B GENERAL MFG CO. *A01 09 *ABY 1234567890002
6     *A10 1806 HIGHWAY 35
7     *A1B OCEAN *A11 NJ *A1C 07712
8  *A00 ST *A0B GEN MFG, PLANT A *A01 09 *ABY 2345678900008
9     *A10 1187 ELM STREET *A1V MS F111
10    *A1B BRANFORD *A11 NJ *A1C 07633
11 *1DH 1 *1D7 2 *1DJ DR *1DK VI *13G XYZ223344
12    *13P F *13T NO.44 DEGREASING SOLVENT
13 *1DH 2 *1D7 250 *1DJ YD *1DK VI *13G PS877665
14    *13P F *13T 36IN HEAVY DUTY POLY SHEET

*FIG. 14*

ROOT RELATION

| AAA | 1KM | 1KN | 1KP | 1KT | >T1 | >T2 | >T3 | >T4 | AMC | AM2 |
|-----|-----|-----|-----------|--------|-----|-----|-----|-----|-----|-----|
| 850 | 00  | NNE | CE5566778A | 940911 | 1   | 1   | 1   | 1   | 2   | 252 |

*FIG. 15*

SUBRELATION T1

| REF. | AOT | A0U |
|------|-----|-----|
| 1    | DEL | DO NOT DELIVER AFTER 3PM |

*FIG. 16*

SUBRELATION T2

| REF. | ALE | AL4 |
|------|-----|--------|
| 1    | 002 | 940915 |

*FIG. 17*

SUBRELATION T3

| REF. | A00 | A0B | A01 | ABY | >T5 | A1B | A11 | A1C |
|---|---|---|---|---|---|---|---|---|
| 1 | BT | GENERAL MFG CO. | 09 | 1234567890002 | 1 | OCEAN | NJ | 07712 |
| 1 | ST | GEN MFG, PLANT A | 09 | 2345678900008 | 2 | BRANFORD | NJ | 07633-1234 |

*FIG. 18*

SUBRELATION T5

| REF. | A10 | A1V |
|---|---|---|
| 1 | 1806 HIGHWAY 35 | |
| 2 | 1187 ELMSTREET | MS F111 |

*FIG. 19*

SUBRELATION T4

| REF. | 1DH | 1D7 | 1DJ | 1DK | 13G | 13P | 13T |
|---|---|---|---|---|---|---|---|
| 1 | 1 | 2 | DR | VI | XYZ223344 | F | NO.44 DEGREASING SOLVENT |
| 1 | 2 | 250 | YD | VI | PS8877665 | F | 36IN HEAVY DUTY POLY SHEET |

FIG. 20

METHOD FOR CREATING A RELATIONAL DESCRIPTION OF A FORMATTED TRANSACTION

RELATED APPLICATIONS

This application is based on commonly owned copending U.S. patent application Ser. No. 60/010,231, filed Jan. 19, 1996 now pending, for a Method for Creating a Relational Description of a Formatted Transaction.

FIELD OF THE INVENTION

This invention relates generally to information processing systems and more particularly to a method of storing and retrieving formatted transactions in a relational database.

BACKGROUND OF THE INVENTION

With the ever-increasing advancements in the field of computer technology, more and more businesses are becoming paperless. Inventories and financial records are kept on computers instead of being tediously documented on ledgers or other paper products. Inter- and intra- office communication is also becoming paperless, including for example the transfer of business cards and calendaring information. This is possible through the use of formatted transactions, the structure of which are agreed upon in advance by each party involved in the transactions. For example, if a buyer and a seller have agreed upon the structure of a particular transaction, the buyer can communicate the transaction data electronically to the seller, and the seller's computer, knowing beforehand the structure of the formatted transaction, will be able to understand and assimilate the received data.

One such method of exchanging data in the form of a formatted transaction is Electronic Data Interchange (EDI). EDI transactions can occur directly between two business parties over a communications line. EDI transactions involve three essential elements: (1) an agreed upon set of standards; (2) a means of communicating data based upon those standards; and (3) a way of incorporating or transforming the data into the system of the receiver.

The American National Standards Institute (ANSI) is the national coordinator for standards in the United States. ANSI approves standards developed primarily by trade, technical, professional, consumer, and labor organizations when evidence is presented that those affected by the standard have substantially reached a consensus regarding its provisions. In 1979, ANSI chartered a committee known as the Accredited Standards Committee (ASC) X12, to develop uniform standards for electronic interchange of business transactions (EDI transactions). The goal of ASC X12 was to structure standards so that computer programs can translate data to or from an EDI transaction without extensive reprogramming.

ASC X12 came up with the X12 Standards for Electronic Data Interchange published in December of 1990 as Draft Version 3, Release 1, (Document Number ASC X12S/90-850). It will be appreciated by those of skill in the art that there are other types of formatted transactions in addition to X12 transactions. These include but are not limited to EDIFACT, ODETTE, and SGML transactions. A particular kind of SGML transaction utilizes the hypertext markup language (HTML) that is used extensively on the Internet.

In theory, EDI transactions offer advantages such as speed and accuracy. One potential advantage is in the area of data integration. EDI transaction data could be received and integrated with the existing business information and data processing systems of the receiving party. Thus, it would be useful to introduce the data into a format where the data can be searched and accessed at a later time, such as by integrating EDI transaction data into a database. However, conventional approaches to integrating EDI transaction data into a database are very limited.

Generally speaking, there are three basic types of databases: hierarchical, network, and relational. In relational databases, different files exist as separate relations, and therefore, there is no structure such as the owner-member structure of the hierarchical database. The relational database structure is not predetermined and relations can be added or deleted from the database schema without affecting the other relations. An additional feature of relational databases is that while hierarchical and network databases are organized to make it efficient to deal with one record at one time and to obtain a single related record at a time, relational databases are organized to efficiently deal with sets of records and to obtain a set of related records at a time.

Existing systems for integrating data into the business information or data processing system of the receiving party are often referred to as "translation systems". Some translation systems deal with EDI data but fail to integrate, store, create or describe the EDI data relationally. Other conventional approaches manipulate data retrieved from database systems but cannot generate an EDI document from such data.

Some translation methods create links between data elements in an EDI document and fields in an application database, but the field mapping or linking is constant in any given application. For example, for a particular EDI transaction, the fields of the data base are predefined or predetermined. Such methods are unable to represent optional or conditional data elements. Further, these methods do not translate the data into relational form such that data can be manipulated as structured, relational data.

Some translation methods conform input data into the output data structure in an electronic information processing system where the input and output data structures are specified in advance. For example under one method EDI formatted data is transformed into a flat file or table. However, this method suffers the disadvantage that the output data structures must be specified before the EDI transaction is processed. Thus, if the EDI transaction format changes, the engine performing the translation must be re-implemented. Further, the method does not provide a way for EDI formatted data to be transformed into a relational database and thus, the advantages of relational databases are not utilized.

Another known method includes receiving data in a first format from a source, executing a script written in a proprietary programming language to translate the data into a second format, and transmitting the data in the second format to a destination. The source and destination may be application programs and various standards of EDI transactions. This method maps data elements to a tree structure based in part on a definition assigned to that element. The method fails to map the EDI data to relations for relational database applications.

Thus, it will be appreciated that it would be an advancement in the art to provide a method for translating EDI data into relations for use in relational database applications. It would be a further advancement to provide a method of translating EDI data into a database format which preserves the context of each data element so that the EDI formatted transaction could be recreated to its original form. Such a method is disclosed and claimed herein.

SUMMARY OF THE INVENTION

This invention includes a method for translating a formatted transaction such as an EDI transaction, or a markup language transaction such as an SGML transaction, into relational form so that the transaction data can be manipulated as structured, relational data. The invention also includes translating such relational data into EDI or another transactional stream form.

Computers cannot examine ordinary letters and other business papers and reliably extract data and understand the meaning of the correspondence. If they could, they could scan a written purchase order, determine what all the data means and act upon it. But a computer can assist in managing data if valid assumptions about the format of the data are embedded in the computer by a method such as computer programming. For instance, computers can help process tax returns.

Thus, electronic stream forms of transaction data are widely used to communicate between two or more conventional computers which have been configured to reflect valid assumptions about the stream format of business transaction data, such as Electronic Data Interchange (EDI) data. Other conventional computers are configured to manage data in a wide variety of forms, including hierarchical, relational, or network database forms. But it has not previously been known to translate directly between a transaction stream format such as EDI and a relational form such as relational database tables.

Each transaction in a transaction stream is formatted according to a predefined transaction format definition. This definition may be a national standard or merely an agreement between communicating partners. The definition describes and declares what types of transactions or communications are defined and what items of data are required, optional, or conditional for each type of transaction or communication. The definition also determines the sequence in which the data is to be arranged and any nesting that the definition supports.

According to one method of the present invention, the transaction format definition is first examined to identify all possible locations of data transmitted in a transaction. The transaction format definition specifies which data declarations can be used only once in a transaction and which data declarations can be used multiple times, with each iteration containing different data. Each location that has a unique context within the transaction is assigned a unique persistent tag. Each tag is unique because it uniquely identifies a data declaration and the data declaration's context in the transaction format definition. Each tag is persistent because the set of tag assignments for a given transaction format remains the same as it is used over and over again for processing transactions having that format. The set of tag assignments may be provided by means known in the art, but the invention's use of the tags is novel.

For each transaction that is processed, a computer configured according to the invention examines the transaction to determine where data elements begin and end. For each data element found, the computer determines from the data element's context which declaration in the predefined transaction format definition describes the data element. The computer tags the data element with the unique persistent tag that was assigned to this declaration, using a tag which incorporates the data element's context in the transaction and in the definition.

The computer then maps each data element to a relation according to the data element's unique persistent tag. Data elements corresponding to data declarations that can only be used once are not nested. Each data element in the transaction that is not nested is written to a root relation such that the column name of the root relation matches the unique persistent tag of the data element. The root relation has at least one column.

Data elements corresponding to data declarations that can be used more than once are nested, regardless of the actual number of data elements in the transaction that correspond to the data declaration. For each nested data element found in the transaction, the computer writes the nested data element to a subrelation such that the column name of the subrelation matches the unique persistent tag of the nested data element. For the first level of nested data elements, the subrelation will be a subrelation of the root relation. For additional levels of nesting, if any, the subrelation will be a subrelation of a previously created subrelation. This writing of subrelations continues to any depth of nesting, so that the nesting relationship in the transaction is preserved in the structure of the relations and subrelations.

Transactions that have been mapped to relations may be accessed as structured, relational data. One method of accessing them includes constructing a new transaction that is equal in content to one of the original transactions, thereby recreating the transaction. The transaction is reconstructed by traversing the relation and its subrelations and for each item of data stored therein, adding a data element separator and data element corresponding to the stored data, and other data, as directed by the predetermined transaction format definition to recreate the data element's context. This is done in a sequence such that the relationships of the subrelations to each other and to the root relation are preserved in the nesting of the data elements in the reconstructed transaction.

The features and advantages of the present invention will become more fully apparent through the following description and appended claims.

BRIEF DESCRIPTION OF THE DRAWINGS

FIG. 2 shows an excerpt from an EDI transaction data stream.

FIGS. 3, 4, and 5 show a transaction set data segment definition.

FIGS. 7 to 12 illustrate assignments of unique persistent tags to data element declarations.

FIG. 13 shows the transaction data stream excerpt of FIG. 2 after it has been tagged with unique persistent tags.

FIG. 14 shows the tagged excerpt of FIG. 13 in an indented, spaced and highlighted form to more clearly illustrate tags and nesting relationships within the transaction.

FIG. 15 is a root relation in a relational structure formed according to the present invention from the example in FIG. 13.

FIGS. 16 to 20 are subrelations of the root relation shown in FIG. 15.

DETAILED DESCRIPTION OF THE INVENTION

The present invention relates to a method and apparatus for managing transaction data in both relational database and electronic transaction forms, and more particularly, to translating data between those two forms.

The present method for creating a relational description of a formatted transaction necessarily includes having a formatted transaction. Formatted transactions include a predefined structure of data elements, or in other words, a transaction is any message that has a structure defined by a format definition. Often this structure will describe what data must be included, what data may optionally be included, what interdependencies exist (if any), how each data element is to be identified so it is interpreted correctly, and what sequence must be adhered to (if any) among the data elements.

While the current invention can be used with any type of structure transaction, it is illustrated below using a specific example based on the ANSI X12 standard transaction format definition. The invention can work with the entire X12 standard, or with a part of the standard or with modifications that meet the needs of particular trading partners. The X12 standards define commonly used business transactions in formal, structured transaction sets. Examples of transaction sets include Invoices, Financial Information Reporting, Tax Information Reporting, Purchase Orders, and Purchase Order Acknowledgments. A transaction set under the X12 standards is composed of a transaction set header control segment, one or more data segments in a predefined sequence, and a transaction set trailer control segment. The transaction set defines the format of data elements transmitted between two appropriately configured computers.

Suitable computers may communicate directly through modems over a telephone line or other direct "wire" communications link. Suitable computers may also reside on a computer network such as a local network, a value-added network, and/or the Internet; "Internet" as used herein includes variations such as a private Internet, secure Internet, or intranet. The computers may be workstations, laptop computers, disconnectable mobile computers, file servers, or a combination thereof. The network may include one or more LANs, wide-area networks, Internet servers and clients, intranet servers and clients, or a combination thereof.

Figure 1:
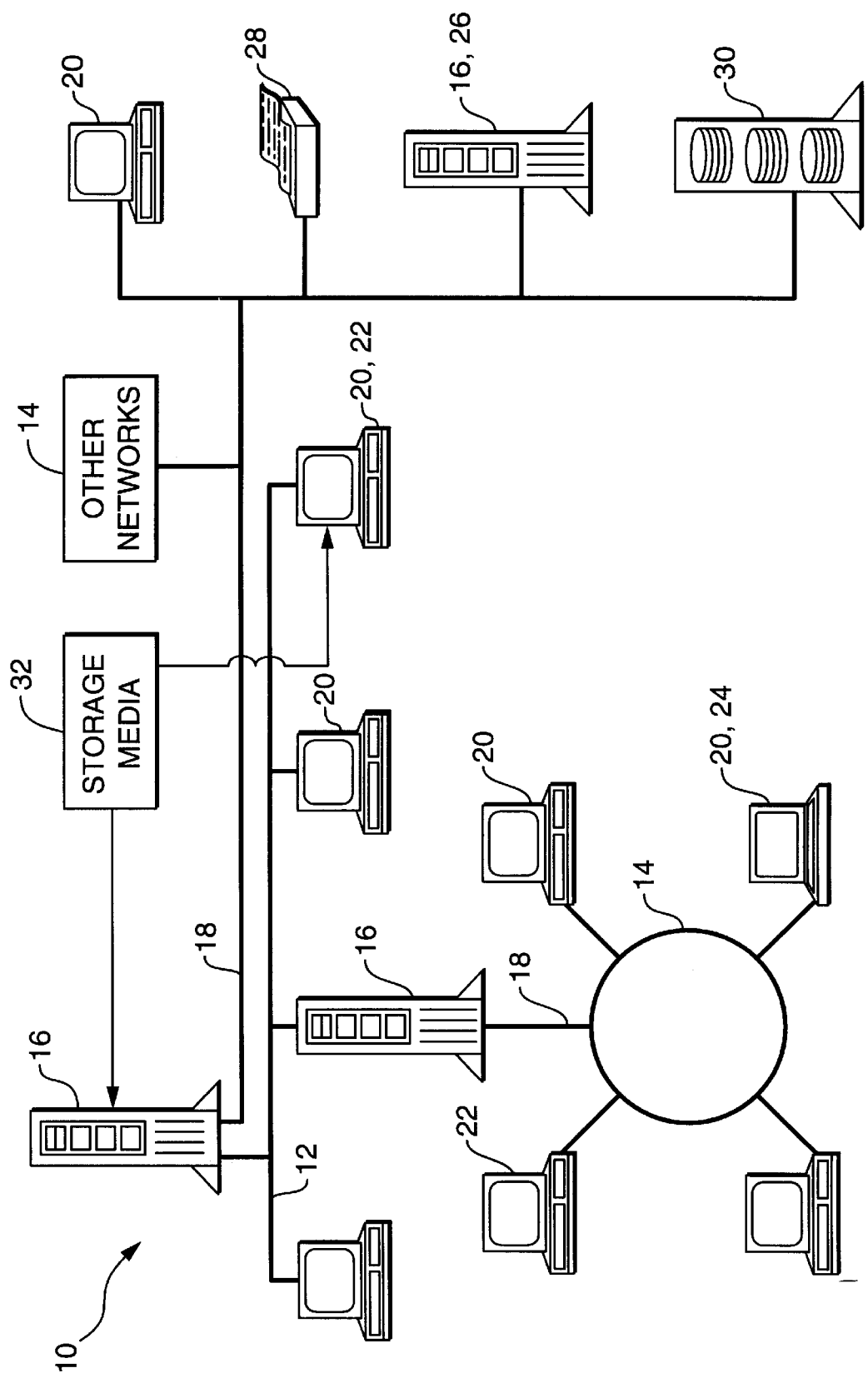
FIG. 1 is a diagram illustrating a computer network suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.) and Novell's NetWare Directory Services software. In alternative embodiments, the network includes NetWare Connect Services, VINES, Windows NT, Windows 95, LAN Manager, Systems Network Architecture, Open Systems Interconnection, TCP/IP, NetBIOS, DECnet, AppleTalk, or LANtastic network operating system software and an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft; APPLETALK is a trademark of Apple Computer, Inc.; DECNET is a trademark of Digital Equipment Corporation). The network 10 may include a local area network 12 which is connectable to other networks 14, including other LANs or portions of the Internet or an intranet, through a gateway or similar mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory services providers or name servers, as transaction servers or clients, as database servers or clients, or as a combination thereof. The servers 16 may be uniprocessor or multiprocessor machines. The servers 16 and clients 20 each include an addressable storage medium such as random access memory or a non-volatile storage medium such as a magnetic or optical disk.

Suitable network clients 20 include, without limitation, personal computers 22, laptops 24, and workstations 26. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform transactional data and relational data management and translation steps of the present invention substantially as described herein.

An Example Purchase Order Transaction

FIG. 2 shows an excerpt from an X12 purchase order transaction, formatted for clarity of illustration. The excerpt is from a data stream of characters used to transmit X12 transactions across the wire. The transaction contains groupings of data into data segments and data elements. Each line in FIG. 2 shows a data segment. At the beginning of each data segment is a two- or three-character segment ID, such as ST, BEG or NTE. The asterisks denote data element separators and the characters following each asterisk until either the next asterisk or the end of the line are data elements. The data stream of characters includes a new line character at the end of each line. The new line character does not print with ink, but it is significant as a data segment terminator.

For clarity of illustration, FIG. 2 does not show characters that are transmitted before and after the actual transaction and that pertain to communication protocols and grouping of several transactions. Those of skill in the art will appreciate that the X12 standard allows for transaction sets to be grouped into Functional Groups which in turn can be packaged in an Interchange Envelope and given a Communications Transport Protocol.

The transaction starts with the transaction set header. The term "ST*850" indicates that the transaction is a purchase order. The present invention operates with transaction format definitions generally, including the X12 transaction set definition for a purchase order. The X12 transaction set definitions define each type of transaction as a sequence of data segments, using a data segment directory that defines each type of data segment as a sequence of data elements and/or composite data structures, a composite data structure directory that defines each type of composite data structure as a sequence of component data elements, and a data element dictionary that defines the format of individual data elements.

Of course, X12 is only one example of a transaction format definition. The invention is not limited to a particular definition such as X12. The X12 distinction between data segments and data elements is helpful in understanding the X12 standard and the example in FIG. 2, but the invention is not limited to transaction format definitions which require that distinction. The invention can also be used with transaction format definitions that have no hierarchy, such as transaction sets, data segments, composite data structures and data elements. The invention can also be used with transaction format definitions such as EDIFACT, ODETTE, SGML and HTML.

An Example Transaction Format Definition

FIGS. 3 to 5 show part of a transaction format definition for a purchase order according to the X12 standard. The definition specifies which data segments are required in a purchase order transaction, which data segments are optional, and the sequence in which the data segments must appear. The structural details of each data segment are defined elsewhere, such as in a data segment directory of the kind shown in FIG. 6. This example is only a small part of the X12 standard; for clarity of illustration, similar sheets for other types of transactions are not shown.

The X12 standard for a given type of transaction generally includes three tables. A first table generally relates to preliminary information such as headers; such information is shown in lines 1–57 of FIGS. 3 and 4. A second table generally relates to the details of the transaction headers; such information is shown in lines 58–97 of FIGS. 4 and 5. A third table (not shown here but illustrated in the X12 standard) generally relates to the summary information. The transaction format definition illustrated in FIGS. 3 to 5 provides the format and establishes the data contents of a Purchase Order transaction.

In FIGS. 3 to 5, each line of text that has a segment ID (SEG. ID column) is a data segment declaration. Each data segment declaration identifies and refers to one of the various kinds of data segments that may be included in a transaction. Each data segment declaration has a descriptive name (NAME column) of the data segment and other information. The data segments are ordered, and ordinal positions (POS. NO. column) are explicitly specified in the X12 standard for each kind of transaction.

Each data segment declaration has a requirement designator (REQ. DES. column) which defines the data segment as mandatory (M), optional (O) or Float (F). The mandatory designator M is used for data segments which must be included in every transaction of the type being defined (a purchase order in this example). The optional designator O is used for data segments which are used at the option of the sender. If optional data segments are used, they must be placed in the predefined sequence established by the transaction format definition. The float designator F is used only for the NTE Note/Special Instruction segment (e.g., line 7 in FIG. 3). The NTE segment may appear anywhere in a transaction between the Transaction Set Header data segment (line 4) and the Transaction Set Trailer data segment (not shown). The NTE segment is usually nested at the end of the data segment to which the note pertains.

Parties to the formatted transaction do not have the option under the X12 standards of arbitrarily determining the sequence of data segments in a transaction set or the sequence of data elements in a data segment. The invention, however, is not limited to the X12 standard, but can be readily used according to the teachings herein with whatever level of flexibility the communicating partners establish.

Each data segment declaration 24 includes a maximum number of uses (MAX USE column). This means the data segment can iterate up to the given number of times at the specified position number within a particular transaction. This type of iteration is an individual iteration. If an individual data segment declaration has a maximum use of greater than one, it is allowed to iterate individually. For example, the Reference Numbers data segment declaration (line 9 in FIG. 3) is allowed to iterate individually; the sender can send up to twelve reference numbers at this point in the transaction, if desired. In a transaction in which the Reference Numbers data segment iterates, this would look like multiple lines in the character stream, each line starting with the segment ID REF.

Data segments can also iterate as a group. According to the X12 standard, a group of semantically related data segments that can iterate as a group is called a "loop". The possible loops are predefined by the transaction set definition. For instance, lines 41–42 define a possible loop. Other loops are defined by lines 43–57, lines 64–65, lines 82–84, lines 85–86, lines 87–97, and lines 58–97, respectively. Note that loops may be nested. The maximum number of times a data segment loop may iterate is shown by its loop repeat (LOOP REPEAT column) value. A data segment may be mandatory in a group of data segments allowed to iterate, but the iteration of the group itself is optional if the beginning segment of the group is designated as optional.

Figure 6:
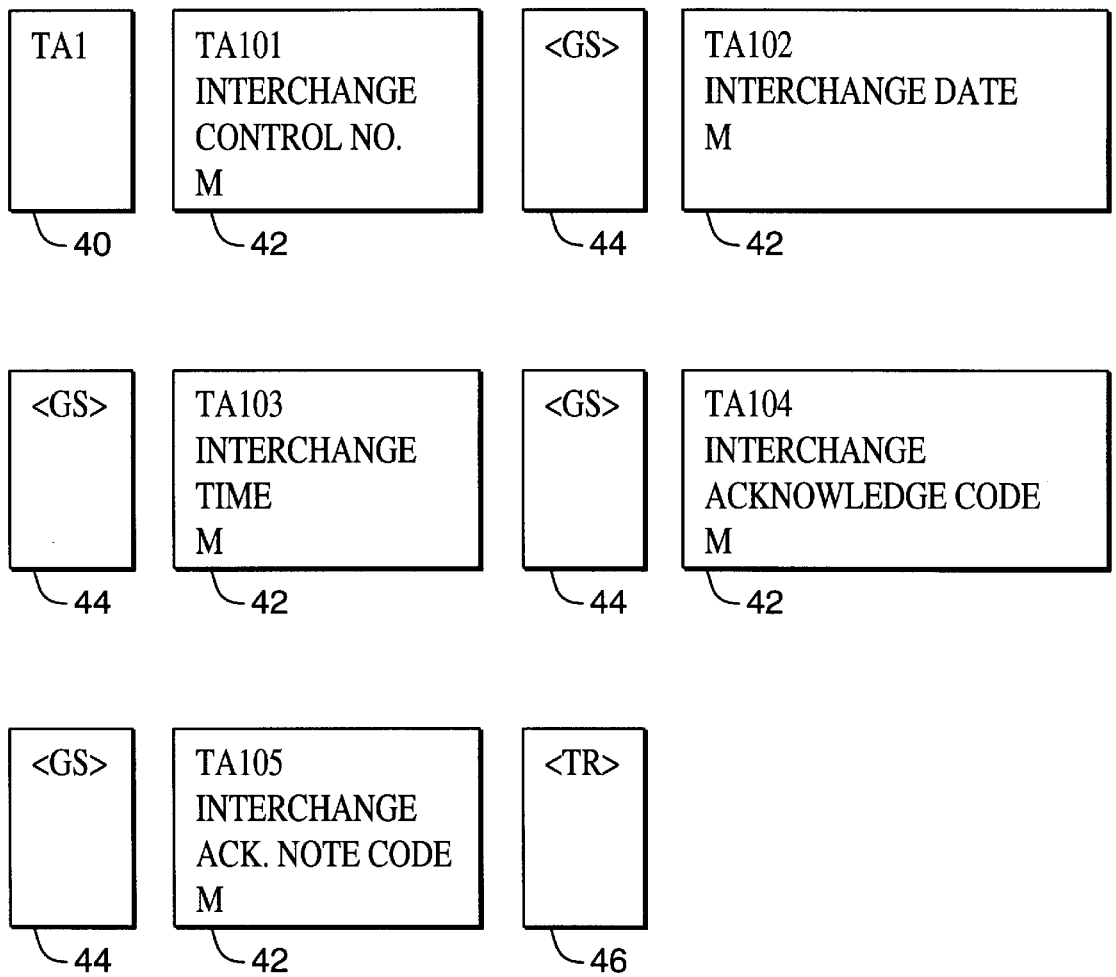
FIG. 6 is a data segment diagram illustrating an entry in a data segment directory.

FIG. 6 shows a data segment diagram which schematically represents an entry in the X12 data segment directory. Each entry in the data segment directory defines the structure of a particular type of data segment. Each such data segment definition starts with a unique segment identifier 40, such as the three characters TA1. This segment identifier 40 is placed in the data stream by the sender and is used by the receiver to identify the segment. The segment identifier 40 corresponds to the segment ID at the beginning of each segment, as illustrated in FIGS. 3 to 5. The body of the segment is one or more logically related data elements 42 and/or composite data structures (not shown) in a predefined sequence. In FIG. 6, the sequence is shown from left to right three times and then top to bottom. Each data element 42 and/or composite data structure is preceded by a data element separator 44, which is a character such as an asterisk. The end of the segment is designated by a data segment terminator 46, which is a character such as the new line character. Thus, the beginning and ending of each data segment and each data element can be determined by reference to the segment's entry in the data segment directory. Composite data structures (not shown) are composed of one or more logically related component data elements separated by a component element separator. The component data elements are in a predefined sequence within the composite data structure.

Data elements 42 or composite data structures may be mandatory, conditional, or optional. If a data element 42 is designated as mandatory, it must appear in the data segment. Conditional data elements are dependent on the presence or absence of other data elements in the same segment. Optional data elements are placed within a data segment at the option of the sender.

Unique Persistent Tags

From the above example of a transaction format definition, it can be seen that a computer receiving a transaction can determine the context and therefore the meaning of each data element in the transmission. One aspect of the present invention preserves the context of the data elements when they are written to relations in a relational database. This is achieved by tagging each data element with a unique persistent tag that uniquely identifies the context and that persists from one transaction to another. Thus, a set of assignments of unique persistent tags to data element contexts should be prepared; this is typically done before processing the first transaction, but processing and tag assignment may also proceed concurrently or step-by-step in turn.

A complete set of assignments includes a unique persistent tag for every possible data element context that can occur in a transaction for every type of supported transaction. In other words, suppose a transaction format definition similar to X12 defines ten types of transactions, and each type of transaction has an average of fifty data segment definitions, and each data segment definition defines an average of four data elements. Then the total number of unique persistent tags would be about two thousand, the product of these numbers. This is the case even though some data segment definitions and some data element definitions will show up several times each, because the tag assignments reflect their context each time they appear.

The invention can be used with fewer than a complete set of assignments when, for example, it is known that certain permissible data element contexts will not be used. Also, the invention may generate a new unique persistent tag on the fly the first time it encounters a new data element context, so long as it remembers the assignment for subsequent times that it encounters the same context.

FIGS. 7 through 12 show selected parts of an example set of assignments for a purchase order transaction. This is similar to the transaction set definition (FIGS. 3 to 5), but is expanded so that every data segment declaration is followed by its data element declarations. The vertical ellipses (e.g., lines 21–23 in FIG. 7) indicate parts not shown for clarity of illustration. The SEG. ID column lists the two- to three-character segment identification where a segment definition is being referenced, similar to the SEG. ID column in FIGS. 3 to 5. On lines 3, 5, 14, 17, and others where a segment identifier is given, the entry in the SEGMENT OR DATA ELEMENT NAME column is a data segment name. Below each data segment name is a list of data element names, one line per data element name, slightly indented to show the nesting relationship. Thus, on lines 4, 6–13, and others where no segment identifier is given, SEGMENT OR DATA ELEMENT NAME column contains a data element name. For example, with reference to FIG. 7, the Description data element on line 27 is one of the data elements that make up the Reference Numbers data segment declaration starting on line 24.

The entire structure of segments and data elements is indented to show nesting relationships. An NTE segment (FIG. 7 line 28) for Note/Special Instruction can occur after many of the other segments and is nested within the segment that it follows.

The TAG column shows the three-character unique persistent tag that is assigned to each data segment declaration or data element declaration. The USE column shows whether the segment or data element is optional (O) or Mandatory (M). A mandatory data element in an optional data segment must be included only if the data segment is used. The USE column also shows a number in parentheses (such as in lines 14, 24, 28) representing the number of times a data segment (or loop) may iterate, if it can be used more than once.

The assignment of unique persistent tags to data element contexts does not have to be done in a table such as that shown in FIGS. 7 through 12. Tag assignment may be accomplished by any of a variety of different methods that serve the need for persistence and uniqueness of the tags, including without limitation data loaded into, generated by or maintained within a computer in any format, structure, class or function. One suitable set of assignments for the X12 Standard is the set of QUALEDI labels provided by The APL Group, Inc. of Wilton, Conn. for a purpose other than the translation methods claimed herein (QUALEDI is a registered trademark of The APL Group, Inc.). Tags may be implemented using GUIDs, UUIDs, or other identifiers.

The context of each data element is determined by the transaction set it is found in, the data segment it is found in, and its position within the data segment. The data segment it is found in can be identified by its position number within the transaction. Thus, two identically defined data elements that are defined in two different types of data segments are always in different contexts and are assigned different unique persistent tags.

Factors that do not change the context include iteration and loops. Thus, in a transaction, when two data segments are two iterations arising from the same data segment definition, these two data segments occur in the same context. They are tagged with two instances of the same unique persistent tag. Within each data segment, corresponding data elements are tagged with multiple instances of the same unique persistent tag, so that if the first data segment's data elements are tagged with the tags AA1, AA2, AA3 and AA4, respectively, then the second data segment's data elements will also be tagged with the tags AA1, AA2, AA3 and AA4, respectively. The same principle applies to data segments that iterate as a group (loops), when two data segments arise from the same data segment definition being used twice in a loop of several data segments.

For example, should the sender decide to use the optional Sales Tax Reference data segment at position 070 (FIG. 3 line 11 and FIG. 8 line 41) and the Location Identifier data element within that data segment (FIG. 8 line 44), this data element would occur in a certain context that is identified by the unique persistent tag OBN. The context is its location in the transaction format definition, and this context has semantic significance.

If the sender opted to include the loop starting with the Name segment at position 310 (FIG. 4 lines 43–57, FIG. 10 line 103), and to use the Geographic Location data segment at position 340 (FIG. 4 line 47, FIG. 10 line 117) and the Location Identifier data element (FIG. 10 line 123) within this segment, this Location Identifier data element would occur in a certain context that is identified by the unique persistent tag A1W. The Location Identifier data elements tagged with OBN and A1W have the same data element definition, (meaning that they are from 1 to 25 characters each), but they differ in their context.

If the sender should decide to send a second name by repeating the Name segment loop (FIG. 4 lines 43–57, FIG. 10 line 103), and to once again use the Geographic Location data segment at position 340 and the Location Identifier data element within this segment, the Location Identifier data element for the second name would be tagged with another instance of the tag A1W. The same tag would be assigned because the Location Identifiers for the two names' Geographic Location data segments occur in the same context, meaning that they both pertain to the geographic location of a name defined in the same place in the transaction format definition. By contrast, the Location Identifier data element (FIG. 8 line 44) of the Sales Tax Reference data segment occurs in a different context because it pertains to a sales tax location.

Processing of the Example Transaction

Referring back to FIGS. 1 and 2, a receiving computer 16 or 20 processes the incoming data character stream in a way that matches up its data elements with the data element declarations of the transaction format definition. The data element 850 (FIG. 2 line 1), occurring where it does in the transaction, tells the receiving computer 16 or 20 that the transaction is a purchase order. The computer 16 or 20 then knows to use the purchase order transaction set definition.

The segments in the purchase order transaction occur in the sequence given in FIGS. 3 to 5. Each segment is terminated by a segment terminator such as the new line character. Thus, each segment appears on one line. The receiving computer knows which segment is next by the two- to three-character segment identification sent in the data stream at the beginning of each segment.

Within a segment, each data element is preceded by a data element separator such as an asterisk. The receiving computer's expectations for each data segment are determined by the data segment's entry in the data segment directory, such as the data segment entry shown in FIG. 6. An optional data element that is not used in the data segment results in a empty field in the transaction. This empty field will show up in the transaction as two adjacent data element separators (asterisks) if other data elements are used later within the same segment. However, if there are no other data elements in the segment then the segment should be terminated early with the segment terminator (a new line character).

This method of processing the transactions allows the receiving computer 16 or 20 to always know where in the transaction format definition (FIGS. 3 to 5) and where in the data segment directory each data element is described. In other words, the receiving computer 16 or 20 always knows each data element's context. The receiving computer 16 or 20 uses this context to find the appropriate unique persistent tag (FIGS. 7 to 12) and then tags each data element with that tag. Once tagging is accomplished, some of the transaction's strict formatting structure may be discarded, such as the segment IDs.

FIG. 13 shows the sample EDI transaction of FIG. 2 after the unique persistent tags have been added. In FIG. 2, each data element was preceded by a data element separator, which is shown by an asterisk. In FIG. 13, a unique persistent tag is placed between the preceding data element separator and the data element to which the tag pertains. The unique persistent tags are the first three characters after every data element separator (asterisk). FIG. 13 is not an essential intermediate data structure, but merely represents one of many ways that data elements can be tagged with unique persistent tags.

To further promote understanding, FIG. 14 shows the same tagged example of FIG. 13 indented to reflect the nesting relationships. In addition, spaces have been inserted to separate various parts of the data stream, and the unique persistent tags are shown in bold italic type. FIG. 14 is likewise not a required step of the invention.

With reference to FIG. 3 line 4, the Transaction Set Header is the first data segment declared in the transaction set definition. By referring to a data segment dictionary for this transaction, looking up the entry for this data segment, it can be determined what data elements are expected in a Transaction Set Header data segment. For example, see FIG. 5 line 3 onward, under Seg. ID ST. This allows each data element in the transaction to be identified as to its context and meaning. For each data element in the transaction of FIG. 2, the beginning and ending of each data segment can be located and the beginning and ending of each data element within the data segment can be located.

FIGS. 15 to 19 show a relational structure corresponding to the sample transaction of FIG. 2. This relational structure is constructed from the transaction as follows. While parsing through the information in the transaction of FIG. 2 and by reference to transaction set definition (FIGS. 3 to 12), the receiving computer 16 or 20 (FIG. 1) can determine which data segment declarations and data element declarations have corresponding data segments and data elements in the transaction. By additionally referencing the set of assignments represented by the Tag column 82 of FIGS. 7 to 12, the computer 16 or 20 can determine which unique persistent tag each data element should be tagged with. The tagged data elements are then written to a relation or subrelation, as determined by their unique persistent tags which incorporate their contexts.

When the receiving computer 16 or 20 encounters information belonging to a data segment that is not allowed to iterate according to the transaction set definition, the information corresponding to the data element or elements of that data segment is mapped to a root relation such as that shown in FIG. 15. In this mapping, the data element is written to a field of the root relation such that the column name of the field matches the unique persistent tag of the data element being written.

For example, suppose the data element in the transaction is 850. This corresponds to the data element declaration, Transaction Set Identifier Code (FIG. 7 line 4). This data element is part of the data segment, Transaction Set Header 40 (FIG. 3 line 4 and FIG. 7 line 3). Because the Max. Use. column in FIG. 3 line 4 contains a one, the receiving computer 16 or 20 knows that this data segment is not allowed to repeat. Thus, there will only be one occurrence of this data element in the context of the data segment Transaction Set Header and in the entire transaction. Accordingly, this information is mapped to the root relation in FIG. 15, to the column named for the unique persistent tag assigned to the data element Transaction Set Identifier Code, namely, the tag AAA (see also FIG. 7 line 4).

If the receiving computer encounters a data segment that is allowed to iterate, the information in this data segment will be written to a subrelation such as those shown in FIGS. 16 to 19, not to a root relation such as the one shown in FIG. 15. In making this determination, it does not matter whether the data segment is allowed to iterate individually or as a group (loop) of data segments. It also does not matter whether the data segment actually iterates in a particular transaction; what matters is whether it is permitted to iterate according to the transaction set definition.

The information in a data segment that is allowed to iterate is written to a subrelation and a key in the parent root relation is assigned to the subrelation. One with skill in the art of relational databases will appreciate that relations have attributes which act as keys to the relation if the attributes uniquely determine a tuple or row in the relation. The first (leftmost) column of each subrelation references the parent relation in which the iterating data segment was encountered. If the parent relation is not the root relation, then the parent relation is a subrelation that arose from a particular iteration in the transaction, and the key references this subrelation. The information associated with the data elements of the data segment that is allowed to iterate are mapped to the subrelation as described above. Thus, each data element is written to a field of the subrelation such that the column name of the field matches the unique persistent tag of the data element being written. To write information to a subrelation, the subrelation is created if it does not already exist. If the needed subrelation (one with the needed column names) already exists, then a new row is created in this subrelation.

For example, referring back to FIGS. 13 and 14, when information such as DEL in line 3 belonging to the data element declaration for Note Reference Code is encountered, it can be seen by reference to FIG. 3 line 7 and FIG. 7 line 15 that this data element is part of a data segment Note/Special Instruction which may iterate up to one hundred times. Thus a subrelation T1 (FIG. 16) is created. Because the parent relation of subrelation T1 is the first row (beneath the row of labels) of the root relation (FIG. 15), the number in the (leftmost) reference column of subrelation T1 (FIG. 16) is one. If subrelation T1 been generated from a row in a parent relation which was itself a subrelation (representing a data segment that is allowed to iterate), the row number in the parent relation would be mapped to the reference column in subrelation T1. Accordingly, the mapping of the data element information by the present invention maintains the context of each data element within the transaction set.

The column headed by >T1, shown for clarity of illustration, represents a pointer from the root relation to subrelation T1. Conventional relational database systems would provide such pointers or links as part of their infrastructure. Similar pointers may also be located in subrelations. The REF. columns in the subrelations likewise represent back pointers that are typically provided by an underlying relational database system. It will be appreciated by those of skill that these relational structures may also be implemented by imposing relations on a previously non-relational data structure or database.

Mapping to subrelation T1 continues until the last data element of the data segment that is allowed to iterate (or group of data segments allowed to iterate) is encountered and mapped. For example, the last data element in the data segment Note/Special Instruction is entitled Message (FIG. 7 line 16) and has AOU assigned as its tag. The data element associated with this data element declaration is DO NOT DELIVER AFTER 3PM, which is mapped into the column named AOU in subrelation T1 (FIG. 16). If there were additional iterations of the Note/Special Instructions data segment, the values or information of the data elements in those iterations would become a second row in the subrelation T1. However, no further iterations are present, so the mapping of subrelation T1 ends and mapping continues with the parent relation.

Note that the data segment Note/Special Instruction was allowed to iterate by definition (FIG. 3 line 7 specifies a maximum use of 100). The sender of the example transaction did not choose to provide information corresponding to this data segment declaration to use it more than once. Thus, although the information mapped into relational form may be different depending on what information the sender decides to include, the rules of mapping are determined according to the definition of the formatted transaction.

The next data segment in the example transaction is identified by a segment ID DTM in line 4 of FIG. 2. The name of this segment is Date/Time Reference (FIG. 9 line 90). As can be seen with reference to FIG. 3 line 20, this data segment is allowed to iterate individually and thus a subrelation T2 (FIG. 17) is created and assigned the key of the parent relation. As noted above, if the subrelation had already existed, then a new row would be added to it. Because subrelation T2 was created from row one (not counting the label row) of the root relation (FIG. 15), the REF. column in subrelation T2 contains a one. The data segment Date/Time Reference defines data elements along with the option to provide notes (FIG. 10 line 97). The sender chose to include only the data elements corresponding to the data element declarations Date/Time Qualifier and Date (YYMMDD) respectively (FIG. 14 line 4). These data element declarations were assigned the unique persistent tags ALE and AL4, respectively. Thus, the information in the transaction associated with these data elements declarations are tagged with the unique persistent tags ALE and AL4, respectively. They are then written to subrelation T2 in fields that are in the columns bearing the column names ALE and AL4, respectively. Because there is only one iteration of this data segment, the mapping to subrelation T2 ceases and mapping continues in the parent relation (FIG. 15).

The next data segment encountered has a segment ID of N1 (FIG. 2 line 5). The name of this segment is Name (FIG. 4 line 43). The Name data segment cannot iterate individually, as its Max Use count is one. However, it is the first data segment of several that can iterate as a group (FIG. 4 lines 43–57). Thus, information in the transaction that pertains to this group of data segments is not mapped to the root relation; it is mapped to a subrelation T3 (FIG. 18) pertaining to this group or one of several nested subrelations arising from subrelation T3.

First, the data elements that are part of the Name data segment are written to the subrelation that pertains to this group. For example, the data element BT (FIG. 2 line 5) is the first data element of the Name data segment and is called an Entity Identifier Code (FIG. 10 line 104). This data element declaration was assigned the unique persistent tag A00, so the data element in the transaction is tagged with A00 (FIG. 13 line 5). The data element BT is written to a field in subrelation T3 (FIG. 18) that pertains to the group; the field is in the column named A00. The other data elements of the Name data segment are processed similarly.

The next data segment in the transaction has a segment ID of N3 and is named Address Information (FIG. 2 line 6). This data segment is a member of the group shown at FIG. 4 lines 43–57, so it can iterate as a group along with the Name segment of FIG. 2 line 5 and other segments. In addition, segment the entry for segment N3 in the Max Use column at FIG. 4 line 46 shows the segment can also iterate individually within each group iteration. Because of this nesting relationship, the N3 segment is not written to subrelation T3, but is written instead to a nested subrelation T5 (FIG. 19) arising from subrelation T3, to a field in the column named A10.

The N4 data segment, which is named Geographic Location, is next in the transaction. It is also a member of the group in FIG. 4 lines 43–57, but its Max Use count is one. Thus, it can not iterate individually and it's three data elements are written to the group's subrelation T3, in column names A1B, A11 and A1C, respectively.

The example transaction of FIG. 2 contains a second Name data segment. This indicates that the entire group of data segments shown in FIG. 4 lines 43–57 is repeating. Of course, optional data segments/elements may still be omitted. What is included or omitted may vary from the previous iteration, although in this example it does not vary. The first data element ST of the second Name data segment is tagged with a second instance of the unique persistent tag A00, the same as the data element BT above, because both data elements are uses of the same data element declaration. The data element ST is mapped to the same column, creating a second row in subrelation T3 (FIG. 18). The mapping process is repeated until all the data elements of the transaction set are mapped to a relation.

When writing data elements to relations, it is possible for the iterating data segment to not have a value for some data element on some iteration. Thus some fields of a relation or subrelation may be left null, although the column name should contain an assigned tag for the particular data element.

The above method of identifying data elements, tagging them with unique persistent tags and mapping them to relations continues for the rest of the transaction. The end of the transaction is indicated by a data segment named Transaction Set Trailer, with Seg. ID SE, that includes as its first data elements the total number of data segments in the transaction. This is useful as a check that everything was interpreted properly.

Reconstructing a Transaction From its Relational Form

After one or more transactions have been mapped to relations, the advantages and tools associated with relational databases become available to manipulate the information obtained from the transactions. The invention includes as an optional step the process of constructing a transaction from its relational description. This is done by traversing the root relation and its subrelations in the sequence appropriate for the particular transaction definition in use. For the X12 standard, this is infix order, meaning that the root relation is traversed from left to right, and whenever a reference to a subrelation is encountered, the subrelation is entirely traversed from left to right before proceeding with the root relation. This continues recursively to any depth of nesting.

During traversal, a transaction is constructed using the non-null data elements in the fields of the relations, the non-null fields' column names, and the set of assignments of unique persistent tags, among other things. The reconstruction step is essentially the reverse of the mapping step that created the relation. The computer 16 or 20 (FIG. 1) keeps track of where it is in the transaction set definition. When it encounters a column name that pertains to a new data segment definition, it adds a segment terminator (e.g., new line) to the character stream. Then it adds the Seg. ID of the new data segment, as looked up in tables such as those in FIGS. 3 to 12.

Before it adds a data element to the character stream, the computer 16 or 20 determines whether any data elements are being skipped in the transaction under construction. This can be accomplished in any of several ways, including letting the transaction format definition govern how data elements are added and/or looking for null fields in the relations. For each null field or skipped data element, a data element separator is placed in the character stream without any accompanying data. For each non-null field, a data element separator is added to the character stream followed by the information in the field. This information is formatted according to the appropriate data element definitions. When there are no more data elements to be added to a data segment, then the segment should be terminated early with a data segment terminator.

If the relation includes a root relation and subrelations, as is often the case, the nesting relationships are preserved if the transaction under construction is assembled in the correct sequence according to the transaction format definition. The correct sequence reflects any sequence constraints imposed by the particular transaction format definition.

SUMMARY

As described above and illustrated in FIG. 21, the present invention provides a method of creating a relational description of a formatted transaction while maintaining data element context. The method begins with a step 48 of obtaining the formatted transaction. The formatted transaction is formatted according to a transaction format definition that declares what data elements are required and what data elements are optional and how the data elements are to be arranged in the formatted transaction. Suitable formatted transactions include, without limitation, Electronic Data Interchange transactions.

The method includes a computer-implemented segment locating step 50 of locating a beginning and locating an ending of at least one data segment within the formatted transaction. This may be accomplished using information similar to that set forth in FIGS. 3 to 12. During a computer-implemented element locating step 52, a beginning and an ending of at least one data element within the data segment are located. Each data element corresponds to a data element declaration, as discussed above. As indicated, the segment locating step 50 and/or the element locating step 52 may be repeated as needed for additional data segments and data elements.

During a computer-implemented tagging step 54, each data element is tagged with a unique persistent tag. As discussed above, the unique persistent tag is unique in the data element's context within the formatted transaction so it identifies the data element's context within the transaction format definition. Tagging may include a step 56 of identifying each data element that is in a data segment that is not permitted to iterate and tagging the data element with a unique persistent tag.

Tagging may also include a step 58 of identifying each data element that is in a data segment that is permitted to iterate individually and identifying each data element that is in a data segment that is permitted to iterate as part of a group of data segments. Each data element that is in a first iteration of a data segment is tagged with a unique persistent tag. Each data element that is in a subsequent iteration of a data segment, if any, is tagged with another instance of the same unique persistent tag that was used for the first iteration of the data segment.

During a computer-implemented mapping step 60, each data element is mapped to a relation according to the data element's unique persistent tag, thereby creating the relational description of the formatted transaction. The relational description may form part or all of a relational database. Each column in the relation corresponds to a different data element, and each column is designated by the data element's unique persistent tag.

The mapping step 60 normally includes a step 62 of creating a root relation. The mapping step 60 optionally includes a step 64 of creating a subrelation corresponding to each data segment and creating a subrelation corresponding to each group of data segments. Each subrelation is referenced by a relation key in a referencing relation.

The mapping step 60 may include a computer-implemented step 66 of processing nested data elements. Each data element that is not nested is identified, and written to a root relation with at least one column name, such that the unique persistent tag of the data element matches the column name of the relation. Each data element that is nested and therefore has a nest relationship in the formatted transaction is identified. For each data element that is nested, if any, a subrelation is created with at least one column name, the subrelation preserving in the relation the nest relationship of the data element in the formatted transaction. The data element is written to the subrelation such that the persistent tag of the data element matches the column name of the subrelation. This is repeated for nested loops within nested loops, if any, to preserve nesting relationships to any depth of nesting.

Figure 21:
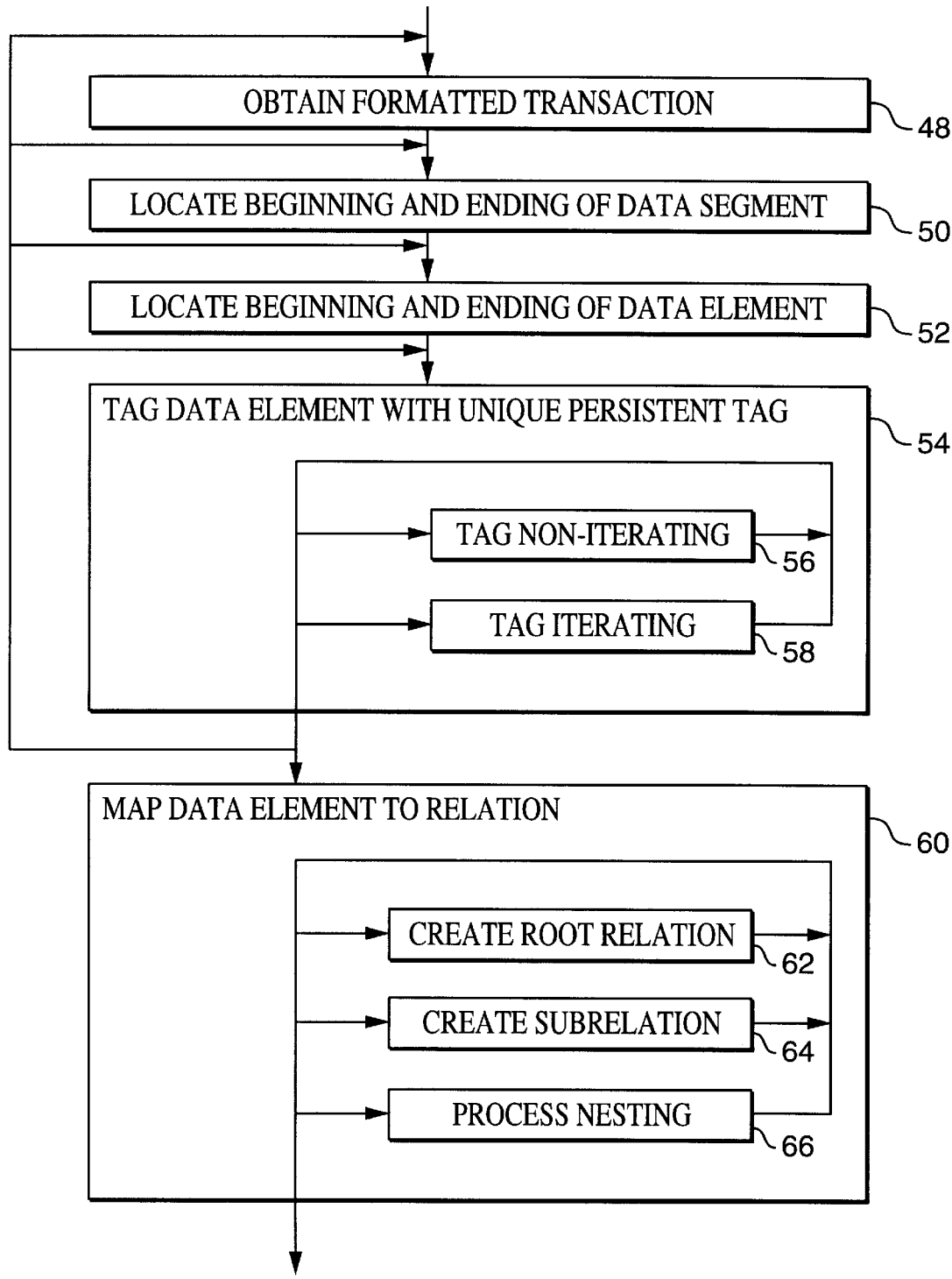
FIG. 21 is a flowchart illustrating methods of the present invention.

The steps illustrated in FIG. 21 may also be reversed to construct a corresponding formatted transaction from the relational description. As discussed above, this may involve steps such as adding to the formatted transaction a data element separator and a data element obtained from the root relation; adding to the formatted transaction a data element separator and a data element obtained from a subrelation and preserving the relationship of the subrelation to the root relation in the nesting of the data element within the formatted transaction being constructed; determining from the column names, the field contents, and the transaction format definition an appropriate transaction header for the formatted transaction and adding the appropriate transaction header to the formatted transaction; determining from the column names and the transaction format definition an appropriate segment ID for the subrelation and adding the segment ID to the corresponding formatted transaction.

The methods of the present invention can be applied equally well to a transaction defined by a markup language such as SGML or HTML. Once data element context is understood the invention can be applied. In a formatted transaction such as an EDI transaction, context depends on position. By contrast, the tokens described by a markup language define the various contexts of each data element. Accordingly, sequence may not be as important in a markup language. Those of skill will also appreciate that the distinction between data segments and data elements is a distinction imposed by X12, not by the invention. The invention requires only that the context of a data element be identified.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method of creating a relational description of a transaction while maintaining data element context, the method comprising the computer-implemented steps of:

locating a beginning and locating an ending of at least one data element within the transaction;

tagging each located data element with a unique persistent tag, the unique persistent tag being unique in the data element's context within the transaction so as to identify the data element's context; and mapping each located data element to a relation according to the data element's unique persistent tag, thereby creating the relational description of the transaction.

2. The method of claim 1, wherein the transaction comprises a formatted transaction.

3. The method of claim 2, wherein the formatted transaction comprises an Electronic Data Interchange transaction.

4. The method of claim 1, wherein the transaction comprises a markup language transaction.

5. The method of claim 1, wherein the relational description comprises a relational database.

6. The method of claim 1, wherein the locating steps comprise locating a beginning and locating an ending of each of a plurality of data segments within a formatted transaction and locating a beginning and locating and ending of each of a plurality of data elements within the data segments.

7. The method of claim 1, wherein the tagging step comprises the computer-implemented steps of:

identifying each data element that is in a data segment that is not permitted to iterate and tagging the data element with a unique persistent tag; and identifying each data element that is in a data segment that is permitted to iterate individually and identifying each data element that is in a data segment that is permitted to iterate as part of a group of data segments, and tagging each data element that is in a first iteration of a data segment with a unique persistent tag and tagging each data element that is in a subsequent iteration of a data segment, if any, with another instance of the same unique persistent tag that was used for the first iteration of the data segment.

8. The method of claim 1, wherein the transaction comprises a formatted transaction containing data segments, and the mapping step comprises the computer-implemented steps of creating a subrelation corresponding to each data segment and creating a subrelation corresponding to each group of data segments, each subrelation being referenced by a relation key in a referencing relation.

9. The method of claim 1, wherein the mapping step comprises the computer-implemented step of creating at least one relation which has at least one column, each column corresponding to a different data element, and each column designated by the data element's unique persistent tag.

10. The method of claim 1, wherein the mapping step comprises the computer-implemented steps of:

(a) identifying each data element that is not nested and for each data element that is not nested, writing the data element to a root relation with at least one column name, such that the unique persistent tag of the data element matches the column name of the relation;

(b) identifying each data element that is nested and therefore has a nest relationship in the transaction and for each data element that is nested, if any, creating a subrelation with at least one column name, the subrelation preserving in the relation the nest relationship of the data element in the transaction, and writing the data element to the subrelation such that the persistent tag of the data element matches the column name of the subrelation; and (c) for nested loops within nested loops, if any, repeating step (b) to preserve nesting relationships to any depth of nesting.

11. The method of claim 1, additionally comprising the computer-implemented steps of constructing a corresponding transaction from the relational description.

12. The method of claim 11, wherein the constructing step comprises the computer-implemented steps of:

for the root relation, adding to the corresponding transaction a data element separator and a data element obtained from the root relation;

for each subrelation, adding to the corresponding transaction a data element separator and a data element obtained from the subrelation and preserving the relationship of the subrelation to the relation in the nesting of the data element within the corresponding transaction being constructed.

13. The method of claim 12 additionally comprising the computer-implemented steps of:

for the root relation, determining from the column names, the field contents, and a transaction format definition an appropriate transaction header for the corresponding transaction and adding the appropriate transaction header to the corresponding transaction;

for each subrelation, determining from the column names and the transaction format definition an appropriate segment ID for the subrelation and adding the segment ID to the corresponding transaction.

14. A method of creating in a computer a relational description of a structured message while maintaining data element context, the structured message formatted according to a predefined markup language definition that declares what data elements are required and what data elements are optional and how the data elements are to be arranged in the structured message, the method comprising the steps of:

providing in the computer a set of assignments of at least one unique persistent tag for at least one unique data element context in the predefined markup language definition, each unique persistent tag being uniquely assigned to a unique data element context in the predefined markup language definition;

the computer locating a beginning and locating an ending of at least one data element within the structured message;

for each data element in the structured message, the computer selecting one of the unique persistent tags according to where the data element occurs in the structured message and where the data element is defined in the predefined markup language definition and the set of assignments and tagging the data element with the unique persistent tag, the unique persistent tag incorporating the data element's context within the structured message according to the predefined markup language definition;

the computer writing each data element to a field in a relation according to the data element's unique persistent tag, such that each field in the relation has a column name and this column name matches the unique persistent tag of the data element written to that field, thereby creating the relational description of the structured message.

15. A method of creating in a computer a relational description of a formatted transaction while maintaining data element context, the formatted transaction formatted according to a predefined transaction format definition that declares what data elements are required and what data elements are optional and how the data elements are to be arranged in the formatted transaction, the method comprising the steps of:

providing in the computer a set of assignments of at least one unique persistent tag for at least one unique declaration of a data element in the predefined transaction format definition, each unique persistent tag being uniquely assigned to a unique declaration of a data element in the predefined transaction format definition;

the computer locating a beginning and locating an ending of at least one data element within the formatted transaction;

for each data element in the formatted transaction, the computer selecting one of the unique persistent tags according to where the data element occurs in the formatted transaction and where the data element is defined in the predefined transaction format definition and the set of assignments and tagging the data element with the unique persistent tag, the unique persistent tag incorporating the data element's context within the formatted transaction according to the predefined transaction format definition;

the computer mapping each data element to a relation according to the data element's unique persistent tag, thereby creating the relational description of the formatted transaction.

16. The method of claim 15, wherein the formatted transaction comprises an Electronic Data Interchange transaction.

17. The method of claim 15, wherein the relational description comprises a relational database.

18. The method of claim 15, wherein the predefined transaction format definition declares what data segments are required in the transaction, what data segments are optional in the transaction, and what data elements are required in each defined data segment, if any, and what data elements are optional in each defined data segment, if any, and wherein the locating step comprises locating a beginning and locating an ending of each of a plurality of data segments within the formatted transaction and locating a beginning and locating and ending of each of a plurality of data elements within the data segments.

19. The method of claim 18, wherein the tagging step comprises the computer-implemented steps of:

identifying each data element that is in a data segment that is not permitted to iterate and tagging the data element with a unique persistent tag;

identifying each data element that is in a data segment that is permitted to iterate individually and identifying each data element that is in a data segment that is permitted to iterate as part of a group of data segments, and tagging each data element that is in a first iteration of a data segment with a unique persistent tag and tagging each data element that is in a subsequent iteration of a data segment, if any, with another instance of the same unique persistent tag that was used for the first iteration of the data segment.

20. The method of claim 18, wherein the mapping step comprises the computer-implemented steps of creating a subrelation corresponding to each data segment that is permitted to iterate and creating a subrelation corresponding to each group of data segments that is permitted to iterate as a group of data segments, each subrelation being referenced by a relation key in a referencing relation.

21. The method of claim 15, wherein the mapping step comprises the computer-implemented step of creating at least one relation which has at least one field, each field having a column name, and writing each data element to a different field such that the unique persistent tag with which the data element is tagged matches the column name of the field to which the data element is written.

22. The method of claim 15, wherein the mapping step comprises the computer-implemented steps of:

(a) identifying each data element that is not nested and for each data element that is not nested, writing the data element to a root relation with at least one column name, such that the unique persistent tag of the data element matches the column name of the relation;

(b) identifying each data element that is nested and therefore has a nest relationship in the formatted transaction and for each data element that is nested, if any, creating a subrelation with at least one column name, the subrelation preserving in the relation the nest relationship of the data element in the formatted transaction, and writing the data element to the subrelation such that the persistent tag of the data element matches the column name of the subrelation; and (c) for nesting within nesting, if any, repeating step (b) to preserve nesting relationships to any depth of nesting.

23. The method of claim 15, additionally comprising the computer-implemented step of constructing a corresponding formatted transaction from the relational description.

24. The method of claim 23, wherein the constructing step comprises the computer-implemented steps of:

for the root relation, adding to the formatted transaction a data element separator and a data element corresponding to the relation;

for each subrelation, adding to the formatted transaction a data element separator and a data element corresponding to the subrelation, preserving the relationship of the subrelation to the relation in the nesting of the data element within the transaction being constructed.

25. The method of claim 24 additionally comprising the computer-implemented steps of:

for the root relation, determining from the column names, the field contents, and the transaction format definition an appropriate transaction header for the corresponding formatted transaction and adding the appropriate transaction header to the corresponding formatted transaction;

for each subrelation, determining from the column names and the transaction format definition an appropriate segment ID for the subrelation and adding the segment ID to the corresponding formatted transaction.

26. A computer-readable storage medium having a configuration that represents data and instructions which cause a computer system to perform method steps for manipulating a formatted transaction, the formatted transaction formatted according to a predefined transaction format definition, the computer system comprising hardware and software for a relational database, the method steps comprising the following steps:

providing an assignment of at least one unique persistent tag for at least one unique declaration of a data element in the predefined transaction format definition, each unique persistent tag being uniquely assigned to a unique declaration of a data element in the predefined transaction format definition;

locating a beginning and locating an ending of at least one data element within the formatted transaction;

for each data element in the formatted transaction, selecting one of the unique persistent tags according to where the data element occurs in the formatted transaction and where it fits in the predefined transaction format definition and tagging the data element with the unique persistent tag, the unique persistent tag incorporating the data element's context within the formatted transaction according to the predefined transaction format definition;

mapping each data element to a relation according to the data element's unique persistent tag, thereby creating the relational description of the formatted transaction.

27. The storage medium of claim 26, wherein the formatted transaction comprises an Electronic Data Interchange transaction.

28. The storage medium claim of 26, wherein the mapping step comprises the steps of:

(a) identifying each data element that is not nested and for each data element that is not nested, writing the data element to a relation with at least one column name, such that the unique persistent tag of the data element matches the column name of the relation;

(b) identifying each data element that is nested and therefore has a nest relationship in the formatted transaction and for each data element that is nested, if any, creating a subrelation with at least one column name, the subrelation preserving in the relation the nest relationship of the data element in the formatted transaction, and writing the data element to the subrelation such that the persistent tag of the data element matches the column name of the subrelation; and (c) for nesting within nesting, if any, repeating step (b) to preserve nesting relationships to any depth of nesting.

29. The storage medium of claim 26, wherein the method steps additionally comprise the step of constructing a corresponding formatted transaction from the relational description.

30. The storage medium of claim 29, wherein the constructing step additionally comprises the steps of:

for the root relation, adding to the corresponding formatted transaction a data element separator and a data element corresponding to the relation;

for each subrelation, adding to the corresponding formatted transaction a data element separator and a data element corresponding to the subrelation, preserving the relationship of the subrelation to the relation in the nesting of the data element within the corresponding formatted transaction being constructed.

31. The storage medium of claim 30, wherein the method steps additionally comprise the step of:

for the root relation, determining from the column names, the field contents, and the transaction format definition an appropriate transaction header for the corresponding formatted transaction and adding the appropriate transaction header to the corresponding formatted transaction;

for each subrelation, determining from the column names and the transaction format definition an appropriate segment ID for the subrelation and adding the segment ID to the corresponding formatted transaction.

32. A method of constructing in a computer a formatted transaction from a relational description of a formatted transaction while maintaining data element context, the relational description including a root relation having at least one field and at least column name of the field and further including at least one subrelation having at least one field and at least one column name of the subrelation's field, the formatted transaction formatted according to a predefined transaction format definition that declares what data elements are required and what data elements are optional and how the data elements are to be arranged in the formatted transaction, the method comprising the steps of:

providing in the computer a set of assignments of at least one unique persistent tag for at least one unique declaration of a data element in the predefined transaction format definition, each unique persistent tag being uniquely assigned to a unique declaration of a data element in the predefined transaction format definition;

for the root relation of the relational description, adding to the formatted transaction under construction a data element separator and a data element corresponding to the relation;

for each subrelation of the relational description, adding to the formatted transaction under construction a data element separator and a data element corresponding to the subrelation, preserving the relationship of the subrelation to the relation in the nesting of the data element within the formatted transaction being constructed.

33. The method of claim 32 additionally comprising the computer-implemented steps of:

for the root relation, determining from the column names, the field contents, and the transaction format definition an appropriate transaction header for the corresponding formatted transaction and adding the appropriate transaction header to the formatted transaction under construction;

for each subrelation, determining from the column names and the transaction format definition an appropriate segment ID for the subrelation and adding the segment ID to the formatted transaction under construction.

34. A computer system for manipulating a formatted transaction while maintaining data element context, the formatted transaction formatted according to a predefined transaction format definition that declares what data elements are required and what data elements are optional and how the data elements are to be arranged in the formatted transaction, the computer system comprising:

a set of assignments of at least one unique persistent tag for at least one unique declaration of a data element in the predefined transaction format definition, each unique persistent tag being uniquely assigned to a unique declaration of a data element in the predefined transaction format definition;

relational database means for writing relations;

tagging means for tagging at least one data element of a formatted transaction with a unique persistent tag that uniquely identifies the data element's context in the formatted transaction; and writing means for writing at least one tagged data element to a relation such that the column name where the data element is written in the relation matches the unique persistent tag of the tagged data element.

35. The system of claim 34, further comprising:

relational database means for reading relations; and reconstructing means for reconstructing a formatted transaction from a relation by reading at least one data element from the relation and for each data element read, arranging a data element separator and the data element as directed by the column name from which the data element was read, the set of assignments, and the transaction format definition, such that the column name identifies the context in the transaction format definition that defines where in the formatted transaction under construction the data element separator and the data element belong.

36. A computer system for creating a formatted transaction from a relational form while maintaining data element context, the formatted transaction formatted according to a predefined transaction format definition that declares what data elements are required and what data elements are optional and how the data elements are to be arranged in the formatted transaction, the computer system comprising:

a set of assignments of at least one unique persistent tag for at least one unique declaration of a data element in the predefined transaction format definition, each unique persistent tag being uniquely assigned to a unique declaration of a data element in the predefined transaction format definition;

relational database means for reading relations;

tagging means for tagging at least one data element of a formatted transaction with a unique persistent tag that uniquely identifies the data element's context in the formatted transaction; and reconstructing means for reconstructing a formatted transaction from a relation by reading at least one data element from the relation and for each data element read, arranging a data element separator and the data element as directed by the column name from which the data element was read, the set of assignments, and the transaction format definition, such that the column name identifies the context in the transaction format definition that defines where in the formatted transaction under construction the data element separator and the data element belong.

* * * * *